July 13, 1965   M. BÖRNER ETAL   3,194,991
MAGNETOSTRICTIVE TRANSDUCER INCLUDING WIRE SUPPORTED RESONATOR
Filed Feb. 13, 1963   2 Sheets-Sheet 1

INVENTORS
Manfred Börner &
Hans Schüssler
BY Spencer & Kaye
ATTORNEYS

United States Patent Office 3,194,991
Patented July 13, 1965

3,194,991
MAGNETOSTRICTIVE TRANSDUCER INCLUDING WIRE SUPPORTED RESONATOR
Manfred Börner, Ulm (Danube), and Hans Schüssler, Ulm, Germany, assignors to Telefunken Patentverwertungs-G.m.b.H., Elisabethenstrasse, Ulm (Danube), Germany
Filed Feb. 13, 1963, Ser. No. 258,321
Claims priority, application Germany, Feb. 21, 1962, T 21,632; Nov. 27, 1962, T 23,082
17 Claims. (Cl. 310—26)

The present invention relates to a magnetostrictive transducer comprising a magnetostrictive tubular resonator, a ring core winding, and a permanent magnet and usable, for example, in a filter or for controlling the frequency of an oscillator.

There exist magnetostrictive resonators which oscillate in torsional mode. Such a resonator is shown in FIGURE 1 in which the tubular resonator 1 has wound about it a ring core winding 2 across whose terminals 3 an alternating current voltage is applied. The resonator is additionally premagnetized by a permanent magnet 4. In this way, there is generated a constant magnetic field whose lines of magnetic flux extend in the direction of the resonator axis and which serves to provide polarization, while the alternating field produced by the ring core winding 2, which last-mentioned field is to bring about the magnetostriction, is built up about the resonator axis. The drawback of such a torsionally oscillating magnetostrictive tubular resonator is that it is very difficult to manufacture the same. One reason for this is that the core winding must not touch the outer surface of the resonator lest it impede the oscillation of the resonator. Consequently, a certain spacing has to be maintained between the winding 2 and the resonator 1. Also, it is, in practice, very difficult physically to mount such a resonator.

There exist other magnetostrictive resonators which partially overcome the difficulties incident to providing the above-described annular core winding. This is shown in FIGURE 2 in which the directions of the constant and alternating fields have been interchanged with respect to the arrangement shown in FIGURE 1. The permanent magnet 4 is thus replaced by a wire 5 which passes through the interior of the resonator and which produces the steady field. A current pulse through the wire 5 brings about a permanent concentric annular core field in the resonator 1. The alternating field, which now has to extend in the direction of the longitudinal axis of the resonator 1, is generated by an alternating current flowing through a winding around the outside of the resonator. But in this arrangement, too, the outer winding 6 must not touch the outer surface of the resonator in order not to impede the oscillation of the magnetostrictive resonator. Also, the arrangement of FIGURE 2 has the additional drawback that the permanent magnetic field which is produced by the current pulse through wire 5 will not, due to the generally rather low coercive force and despite the closed magnetic path, be maintained in the material of which the resonator is made, which material is selected for its very good magnetostrictive characteristics.

It is, therefore, an object of the present invention to provide an arrangement which overcomes the above-enumerated disadvantages and, with this object in view, the present invention resides in an arrangement which is based on that shown in FIGURE 1 but differs therefrom in that the ring core winding consists of a single massive or heavy winding which also serves as a mechanical mounting for the magnetostrictive tubular resonator.

Additional objects and advantages of the present invention will become apparent upon consideration of the following description when taken in conjunction with the accompanying drawings in which:

FIGURES 1 and 2, already referred to above, show, in perspective, transducer arrangements according to the prior art.

Figure 1:
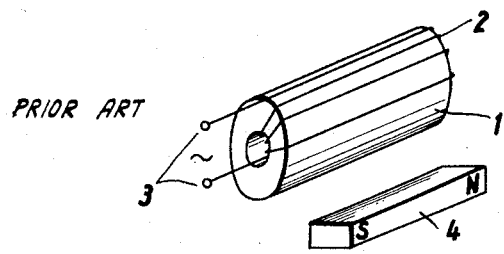
Figure 2:
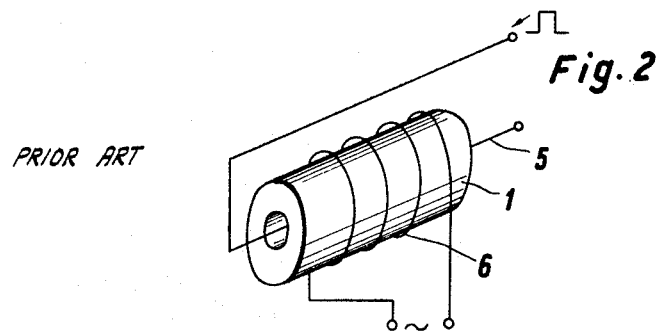

FIGURE 1, which shows a prior art arrangement wherein the resonator 1 has wound about it a ring core winding 2 across whose terminals an alternating voltage is applied, the resonator being premagnetized by a permanent magnet 4, and FIGURE 2, which shows a prior art arrangement wherein the resonator 1 has passing through it a wire 5 through which a current pulse is passed and an outer winding through which flows an alternating current, are already described above.

Figure 3:
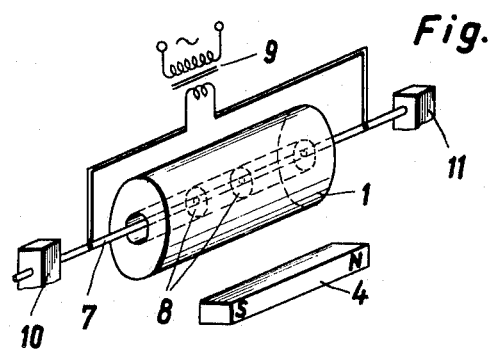
FIGURE 3 shows, in perspective, one embodiment of a transducer arrangement according to the present invention.

Referring next to FIGURE 3 of the drawing, the same shows a magnetostrictive resonator 1 which is physically held by means of a massive and sufficiently rigid wire 7 which passes through the interior of the resonator, this wire 7 carrying disc-like attaching elements 8 which engage, at their peripheries the interior surface of the resonator. Here it is especially pointed out that the inner surface of such a resonator is relatively insensitive to the oscillations; more particularly, the inner surface of a tubular torsion resonator is less sensitive to torsional oscillations than is the outer surface, when the latter is damped by the mounting means, by a factor of $(D_i/D_o)^4$, where $D_i$=the inner diameter and $D_o$=the outer diameter. At the same time, the mounting wire 7 also serves as the ring core winding for producing the alternating magnetic field in the magnetostrictive material. Accordingly, the two ends of the wire 7 which extend out of the interior of the resonator are connected to a matching transformer 9 which, in practice, is needed due to the low inductivity of the wire of this ring core winding. The steady magnetic field needed to produce the polarization is generated by the permanent magnet 4, as was the case in the arrangement of FIGURE 1.

In practice, the disc-like elements 8 are secured to the wire 7 so as to prevent the structure from slipping. This can be done, for instance, by gluing, soldering, welding, shrinking, screwing, fusing or otherwise securing the elements 8 to the wire 7, and the elements can, in similar manner, be connected with the inner surface of the resonator. The free ends of wire 7 are fixedly held, as, for example, in mounting blocks 10, 11, which may be made of plastic and be part of a housing (not shown).

Figure 4:
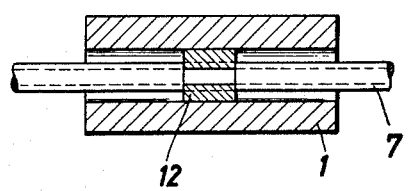
FIGURE 4 shows, in section, a modified embodiment of a transducer arrangement according to the instant invention.

FIGURE 4 shows the resonator 1 as having secured to it a metallic or plastic cylindrical sleeve 12 which is secured to the inner surface of the resonator, in any of the above-described ways, at a point as close as possible to the nodal plane of the resonator. The sleeve 12 itself is provided with an internal thread, while the wire 7 is externally threaded and passes through the bore of the sleeve 12 so as to be in threaded engagement therewith. The free ends of the wire will be held in the manner described above.

In a particularly advantageous practical embodiment of the present invention, the individual component parts of the transducer are structurally arranged as follows: the two free ends of the wire 7 are held by two pole shoes which are electrically insulated from each other, which pole shoes are so arranged that they serve, firstly, for feeding the electrical energy to the ring core winding constituted by the wire, and secondly, for feeding to the resonator the magnetic lines of flux of the permanent magnet which is positioned between the two pole shoes and is electrically insulated therefrom.

Figure 5:
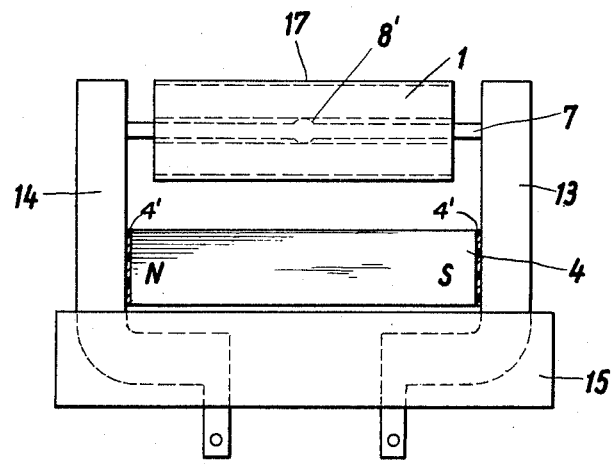
FIGURE 5 shows, in plan, yet another modified embodiment of a transducer arrangement according to the present invention.

Such an arrangement is shown in FIGURE 5 in which the magnetostrictive resonator 1 is supported by the massive wire 7 which passes through the interior of the resonator. The wire has pressed out portion 8' which engage the resonator 1. The two free ends of the wire are held by the pole shoes 13 and 14 which themselves are held by an appropriately configured mounting block 15 which is made of insulating material and may constitute part of the housing for the transducer, the pole shoes, which are suitably made of iron, thus being electrically insulated from each other. The lower ends of the pole shoes, as viewed in FIGURE 5, which project beyond the mounting block 15 which may have a cross section smaller than the remainder of the respective pole shoes, serve as terminal blocks across which is applied the voltage that causes the flow of current through wire 7. In this way, the current supply to the wire 7 will offer a low resistance. This is important because the voltage source to be applied across pole shoes 13, 14, has to have a very low internal resistance. For this reason, too, it is expedient to coat the surfaces of the pole shoes with silver, thereby to reduce their resistance.

The permanent magnet 4 is interposed between the pole shoes 13, 14, as shown in FIGURE 5. If the permanent magnet is made of iron, suitable insulating layers 4' will be provided between the pole shoes and the ends of the magnet. This additional insulation can be dispensed with if the magnet is a ferrite magnet.

The resonator 1 is also shown as being provided with a weldable metallic coating 17, which allows coupling elements to be easily joined to the resonator. Such coupling elements serve to connect the resonator with other mechanical resonators. The metal coating can be constituted by a fused or glazed-on sheet consisting of a nickel alloy whose coefficient of thermal expansion is matched to that of the ferrite resonator and that of the glass flux used in the glazing operation.

Figure 6:
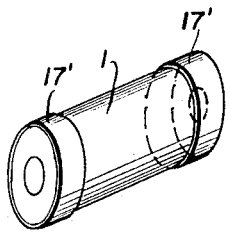
FIGURE 6 is a perspective view showing a modification of a resonator incorporated in a transducer arrangement according to the present invention.

As shown in FIGURE 6, the metal coating may be applied only to the end region of the resonator to form bands 17', since this is where the coupling elements will generally be attached to the resonator.

The following is an example of a transducer arrangement according to FIGURE 5:

The resonator 1 is made of Ni-ferrite, has a length of 8.0 mm., has an inside diameter of 1.8 mm. and an outside diameter of 3.8 mm. and therefore weighs approximately 0.35 gram. The wire 7 is made of copper and has an outside diameter of 1.2 mm. Consequently, the wire is sufficiently massive to constitute the physical support means for the resonator 1.

The metal coating is made of a 51Ni-1Cr-48Fe alloy and is approximately 100 microns thick. In the embodiment of FIGURE 6, each band of coating extends approximately 1.5 mm. from the respective end of the resonator.

It will be understood that the above description of the present invention is susceptible to various modifications, changes, and adaptations, and the same are intended to be comprehended within the meaning and range of equivalents of the appended claims.

What is claimed is:

1. A transducer arrangement comprising, in combination:
   (a) a magnetostrictive tubular resonator oscillatable in torsional mode;
   (b) a permanent magnet associated with said resonator for generating a constant magnetic field which polarizes said resonator;
   (c) a ring core winding consisting of a single turn, said winding having a wire extending through said tubular resonator; and
   (d) means attaching said wire to the inner surface of said tubular resonator, said wire being sufficiently massive and stiff to constitute the means for supporting said resonator.

2. A transducer arrangement as defined in claim 1 wherein said attaching means comprise disc-like elements affixed at their center to said wire and at their peripheries to said inner surface of said tubular resonator.

3. A transducer arrangement as defined in claim 2 wherein said wire is threaded and said attaching means comprise an internally threaded sleeve whose outer surface is affixed to said inner surface of said resonator, said wire passing through said sleeve and being in threaded engagement therewith.

4. A transducer arrangement as defined in claim 3 wherein said sleeve is made of a material selected from the group consisting of metal and plastic.

5. A transducer arrangement as defined in claim 1 wherein said attaching means comprise portions which are pressed out of said wire and engage said inner surface of said resonator.

6. A transducer arrangement as defined in claim 1 wherein said attaching means engage said inner surface of said resonator in the region of the nodal plane of said resonator.

7. A transducer arrangement as defined in claim 1 wherein said wire has free ends extending beyond said resonator, said free ends being held by plastic mounting blocks.

8. A transducer arrangement as defined in claim 1 wherein said wire has free ends extending beyond said resonator, said transducer arrangement further comprising two pole shoes which are electrically insulated from each other, said pole shoes holding said free ends of said wire, respectively, and constituting the means for supplying electrical energy to said wire as well as the means for physically supporting said wire.

9. A transducer arrangement as defined in claim 8 wherein said permanent magnet is located between said pole shoes, the latter thereby additionally constituting the means for feeding to the resonator the magnetic lines of flux generated by said permanent magnet.

10. A transducer arrangement as defined in claim 9 wherein electrical insulation is provided between said permanent magnet and said pole shoes.

11. A transducer arrangement as defined in claim 9 wherein said pole shoes are made of iron.

12. A transducer arrangement as defined in claim 9 wherein the surfaces of said pole shoes are silver coated.

13. A transducer arrangement as defined in claim 1 wherein at least a portion of the outer surface of said resonator is provided with a weldable metallic coating.

14. A transducer arrangement as defined in claim 13 wherein said weldable metallic coating is a nickel alloy glazed onto said resonator, said coating having a coefficient of thermal expansion which is matched to that of the material of which said resonator is made and to that of the glass flux used in the glazing operation.

15. A transducer arrangement as defined in claim 13 wherein the outer surface of said resonator is provided with said weldable metallic coating.

16. A transducer arrangement as defined in claim 13 wherein said weldable metallic coating is provided only in the end regions of said resonator.

17. In a transducer arrangement, the combination which comprises:
   (a) a magnetostrictive tubular resonator oscillatable in torsional mode;
   (b) a ring core winding consisting of a single turn, said winding having a wire extending through said tubular resonator; and
(c) means attaching said wire to the inner surface of said tubular resonator, said wire being sufficiently massive and stiff to constitute the means for supporting said resonator.

References Cited by the Examiner
UNITED STATES PATENTS 2,696,560  12/54  Roberts _____ 331—157
2,920,529   1/60  Blythe _____ 317—169 X MILTON O. HIRSHFIELD, *Primary Examiner.*